(12) United States Patent
Liu et al.

(10) Patent No.: US 7,457,522 B2
(45) Date of Patent: Nov. 25, 2008

(54) SYSTEM AND METHOD OF DVD PLAYER FOR DISPLAYING MULTIPLE SUBTITLES

(75) Inventors: Eldon Liu, Taipei (TW); Wen-Chieh Lee, Taipei (TW)

(73) Assignee: Corel TW Corp., Taipei (TW)

( * ) Notice: Subject to any disclaimer, the term of this patent is extended or adjusted under 35 U.S.C. 154(b) by 868 days.

(21) Appl. No.: 11/030,119

(22) Filed: Jan. 7, 2005

(65) Prior Publication Data

US 2005/0152684 A1 Jul. 14, 2005

(30) Foreign Application Priority Data

Jan. 9, 2004 (TW) .............................. 93100605 A

(51) Int. Cl.
*H04N 5/91* (2006.01)
*H04N 5/00* (2006.01)

(52) U.S. Cl. ......................................... 386/95; 386/125

(58) Field of Classification Search ....................... None
See application file for complete search history.

(56) References Cited

U.S. PATENT DOCUMENTS

2003/0035063 A1* 2/2003 Orr ............................. 348/465

2006/0210245 A1* 9/2006 McCrossan et al. ........... 386/95

* cited by examiner

*Primary Examiner*—John W. Miller
*Assistant Examiner*—Heather R Jones
(74) *Attorney, Agent, or Firm*—Rosenberg, Klein & Lee

(57) ABSTRACT

A system and method of a DVD player for displaying multiple subtitles includes a loading platform for reading digital data of DVD storage media; an interface management platform of receiving end for transmitting a decoded message of a first subtitle set image to a comparison platform. The comparison platform is for checking whether control signal of the first subtitle set image from the loading platform exists in an accumulator register. If not, the digital data is analyzed and decoded through an analytic platform and a decoder platform according to an identifying code of data flow and the first subtitle set image control signal. Then a mixed digital video signal and a digital audio signal are outputted by an image construct platform and an output platform. The interface management platform of receiving end continuingly transmitting a decoded message of a second subtitle set image to the comparison platform and the comparison platform reads control signal of the second subtitle set image and compares it with the first subtitle set image retained temporarily in the accumulator register for decoding the subtitle set image contol signal inexistent in the accumulator register.

11 Claims, 8 Drawing Sheets

SYSTEM AND METHOD OF DVD PLAYER FOR DISPLAYING MULTIPLE SUBTITLES

BACKGROUND OF THE INVENTION

The present invention relates to a system and method of a DVD player for displaying multiple subtitles, especially to a system and method having an accumulator register for temporarily retaining control signal of a first subtitle set image, a comparison platform for comparing a second subtitle set image control signal with the first subtitle set image control signal inside the accumulator register, and a decoder platform for decoding control signal of the subtitle image set inexistent in the accumulator register. Therefore the repeated decoding procedure of images and subtitles as well as the waste of system resources and users' time is avoided.

In earlier days, analogue storage media such as video tapes, LD (Laser Disk), V8, Hi8 will have abrasion of magnetic tape, unclear images, and difficulties in editing after being read repeatedly for a period of time. In order to improve above shortcomings, a new generation device based on VCD (video compact disk) and DVD (digital video disk) techniques is produced by the development of digital video and audio products.

In order to convert analogue video/audio information into digital data, the problem of sampling resolution and sampling rate must be solved. For reducing size of digital video/audio files, MPEG (Motion pictures experts group) technique is used widely. Although MPEG is a kind of lossy compression, it offers high compression ratio and low image distortion. As to digital video/audio products, VCD and DVD are well known and popular. However, due to the low image quality of VCD, DVD technique with better image quality has gradually received much attention.

As mentioned in U.S. Pat. No. 5,978,916, DVD is a specification for the content of video, audio and other compressed data to be used as playback video, audio and, for example, subtitle data by a DVD decoder. The DVD video data is specified in the moving picture experts group (MPEG) standard.

Moreover, refer to U.S. Pat. No. 5,907,658, with large storage capacity of DVD, it is possible for users to choose a single subtitle from subtitles of several different languages. The DVD system can replace the displaying subtitle with another subtitle of different language.

However, DVD has a disadvantage that at least two subtitles with different languages can't be displayed at the same time point. Refer to FIG. 1, a prior art of DVD technique is disclosed. A DVD player read digital data inside an optical disk 1' and load it into a management unit 2'. Then by an identifying code of data flow, an analytic unit 3' analyzes the digital data into a video image data flow, a subtitle image data flow and an audio data flow. And the data flows are converted into a video signal 5', a subtitle image signal 6', and an audio signal 7' by a decoder unit 4'. An output unit 8' transmits the video/audio signals into a display device for playing. Thus a prior art can only display a subtitle image. Users in receiving end can't enjoy the playing of subtitles of multi-languages.

Another common technique in a prior art, refer to Taiwanese Patent Application No. 89110234—"DVD player displaying two subtitles at the same time and the method thereof", a receiving end can choose two subtitles before decoding procedure. Although two subtitles are displayed at the same time by this way, users in receiving end need to wait for a longer time for decoding two subtitles and images. Moreover, when users in receiving end want to re-choose two subtitles, device need to re-choose the images and two subtitles for decoding. Thus the images and subtitles are repeatedly decoded, causing waste of system resources and time.

Therefore, there is a need to provide a system and method of DVD player for displaying multiple subtitles for users.

SUMMARY OF THE INVENTION

Therefore, it is a primary object of the present invention to provide a system and method of DVD player for displaying multiple subtitles that users an accumulator register to retain temporarily at least one decoded first subtitle set image data. When users in receiving end want to choose at least a second subtitle set image data again, an interface management platform of receiving end transmits a decoded message of the second subtitle set image data into a comparison platform. The comparison platform reads the second subtitle set image data and compares it with the data inside the accumulator register. The subtitle set image data inexistent in the accumulator register is decoded, and the decoded subtitle set image data is retained temporarily inside the accumulator register so as to achieve a system and method of DVD player for displaying multiple subtitles.

It is another object of the present invention to provide a system and method of DVD player for displaying multiple subtitles that reduces repeatedly decoding procedures of images and subtitles to prevent waste of system resources and time. An interface management platform of receiving end transmits a decoded message of a second subtitle set image to a comparison platform. When the comparison platform checks that at least a second subtitle set image control signal is the same with the subtitle set image control signal inside the accumulator register, there is no decoding procedure. When the subtitle set image control signal inside the accumulator register is the same with only part of image control signal of the second subtitle set, only part of the second subtitle set image control signal inexistent in the accumulator register is decoded so as to avoid repeated decoding. When the whole second subtitle set image control signal is inexistent in the accumulator register, the subtitle set image control signal inside the accumulator register is deleted and the second subtitle set image control signal is decoded so as to reduce the repeated decoding of images and subtitles.

It is a further object of the present invention to provide a system and method of DVD player for displaying multiple subtitles that saves the waiting time of users in receiving end. The comparison platform is used to check the subtitle set users choose for avoiding repeated decoding of video image and subtitle set image so that waiting time of users in receiving end is reduced.

It is still a further object of the present invention to provide a system and method of DVD player for displaying multiple subtitles that satisfy users needs of choosing multiple subtitles. Besides controlling of the opening, deletion and choices of subtitles, the present invention assures the double subtitles won't have any negative effect on the display of video images and voices.

In order to achieve objects, the present invention provides a system and method of DVD player for displaying multiple subtitles that includes a loading platform for reading digital data, an identifying code of data flow and a first subtitle set image control signal having a plurality of subtitle image control signals from a DVD storage media; an interface management platform of receiving end for receiving and transmitting a decoded message of a first subtitle set image; an accumulator register for temporarily retaining images and accumulating the decoded subtitle set image data that is composed by a subtitle set image control signal and a subtitle set image signal; a comparison platform for checking whether the first subtitle set image control signal exists in the accumulator register and temporarily retaining the inexistent subtitle set image control signal inside the accumulator register; an analytic for analyzing the digital data into a video data flow, an audio data flow and a first subtitle set image data flow according to the identifying code of data flow and the first subtitle set image control signal; a decoder platform for decoding the video data flow, the audio data flow and the first subtitle set image data flow respectively to produce a digital video signal, a digital audio signal and a first subtitle set image signal and retain the digital video signal and the first subtitle set image signal temporarily inside the accumulator register; an image construct platform for mixing the digital video signal and the subtitle set image signal inside the accumulator register and adjusting the positions of the video signal and the subtitle signal in images; and an output platform for outputting the digital video signal and the digital audio signal. The interface management platform of receiving end continuingly transmits at least one decoded message of a second subtitle set image to the comparison platform. The comparison platform reads a second subtitle set image control signal and makes a comparison between the second subtitle set image control signal and the subtitle set image control signal inside the accumulator register so as to avoid the repeated decoding procedure of images of subtitles, the waste of system resources and the time consumption. And users' needs of multiple subtitles are satisfied.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFFERED EMBODIMENT

Figure 1:
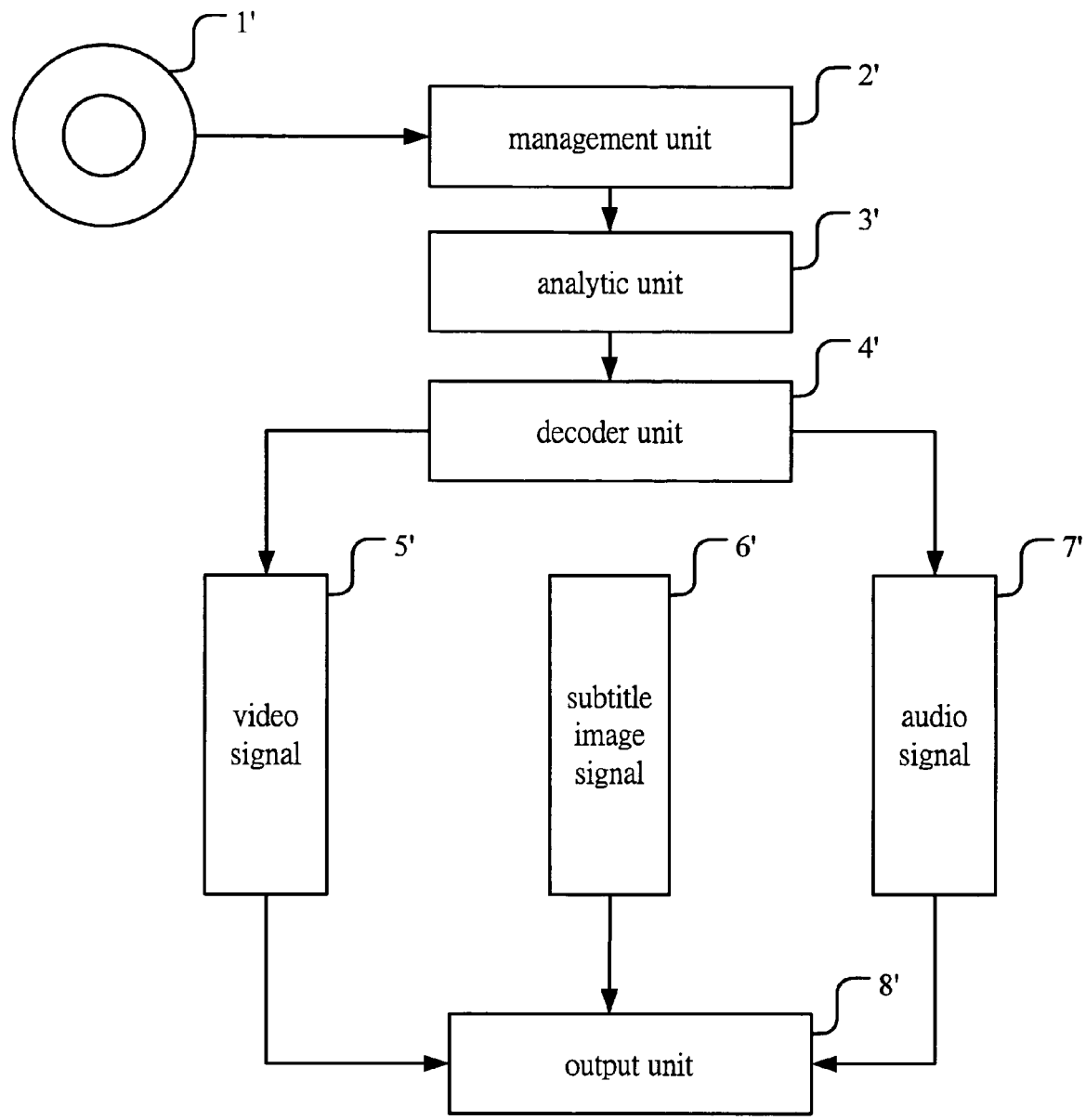
FIG. 1 is a schematic drawing of a DVD player of a prior art.
Figure 2:
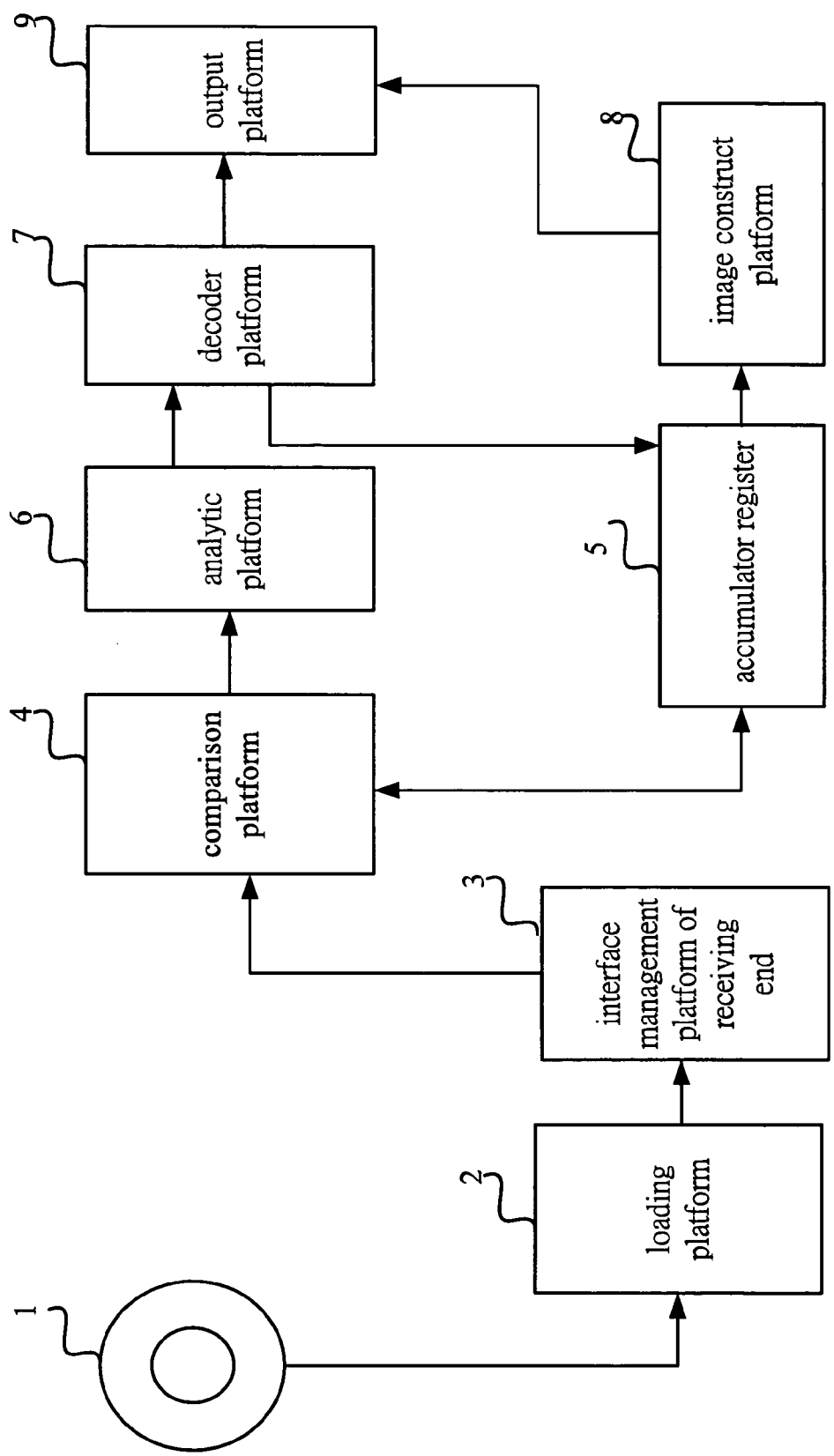
FIG. 2 is a schematic drawing of a system of a DVD player for displaying multiple subtitles in accordance with the present invention.

Refer to FIG. 2, an embodiment in accordance with the present invention is disclosed. The present invention is composed by a loading platform 2 that reads digital data form a DVD storage media—an optical disk 1. The digital data includes an identifying code of data flow and a first subtitle set image control signal having a plurality of subtitle control signal. An interface management platform of receiving end 3 is used to transmit a decoded message of a first subtitle set image into a comparison platform 4 that checks whether the first subtitle set image control signal is retained temporarily in an accumulator register 5. If the first subtitle image control signal is not retained in the accumulator register 5 before, then the first subtitle image control signal is retained temporarily therein. Then an analytic platform 6 receives the first subtitle set image control signals and the identifying code of data flow transmitted from the interface management platform of receiving end 3, analyzes them into digital data flow and transmits the digital data flow to a decoder platform 7. After being decoded, a digital video signal, a digital audio signal, and a first subtitle set image signal are produced and then the digital video signal and the first subtitle set image signal are retained temporarily in the accumulator register 5.

Later an image construct platform 8 is used to retrieve the video and subtitle set image signals inside the accumulator register 5 for adjusting positions of images and subtitles. An output platform 9 is used to output the digital video signal and the digital audio signal. While the interface management platform of receiving end 3 continuingly receives at least a decoded message of a second subtitle set image chosen by users and transmits it to the comparison platform 4. After receiving the message from the interface management platform of receiving end 3, the comparison platform 4 reads a second subtitle set image control signal provided by the loading platform 2 and compares the second subtitle set image control signal with the control signal inside the accumulator register 5 for instructing the decoder platform 7 to decode the subtitle set image control signal inexistent inside the accumulator register 5.

The present invention includes an interface management platform of receiving end 3, a comparison platform 4, an accumulator register 5, an analytic platform 6, a decoder platform 7, an image construct platform 8 and an output platform 9. The accumulator register 5 is used to temporarily retain decoded video and subtitle set image data. The subtitle set image data includes a subtitle set image control signal and the decoded subtitle set image signal. The analytic platform 6 is used to analyze the digital data into a video data flow, an audio data flow, and a first subtitle set image data flow. The decoder platform 7 is used to decode the video data flow, the audio data flow, and the first subtitle image data flow to produce a digital video signal, a digital audio signal, and a first subtitle set image signal. The image construct platform 8 is for mixing the digital video signal and the subtitle set image signal inside the accumulator register so as to produce a mixed digital video signal. And the output platform 9 is to output the mixed digital video signal and the digital audio signal.

Figure 3:
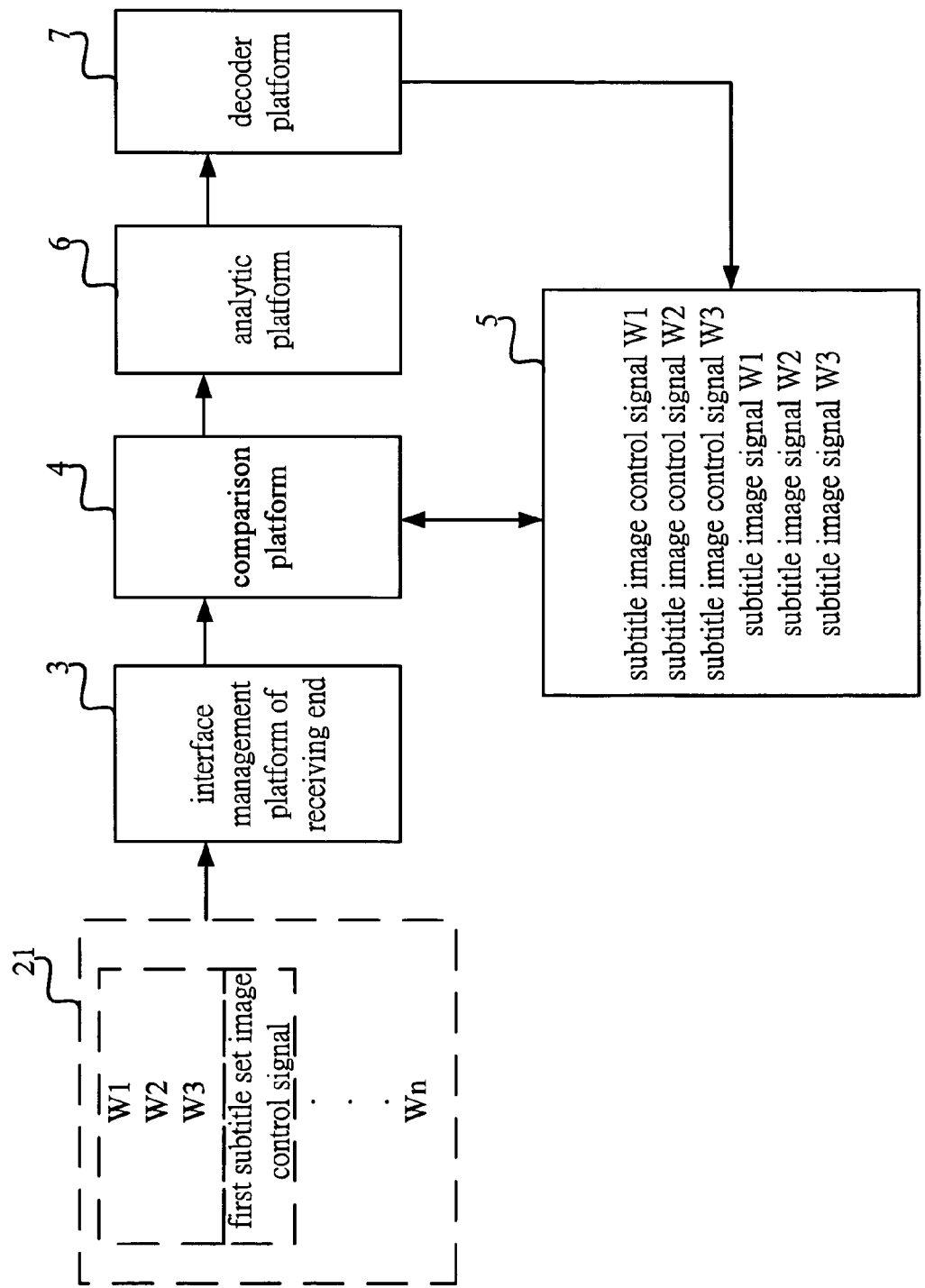
FIG. 3 is a schematic drawing of a first subtitle set image data inside an accumulator register in accordance with the present invention.

Refer to FIG. 3, a first subtitle set image data inside an accumulator register of an embodiment in accordance with the present invention is disclosed. As shown in figure, users in receiving end instruct the comparison platform 4 through the interface management platform of receiving end 3 to make a comparison of the first subtitle set image control signal inside the accumulator register 5. The first subtitle set image control signal consists of a subtitle image control signal W1, a subtitle image control signal W2, and a subtitle image control signal W3. When the accumulator register 5 is an empty set, the first subtitle set image control signal is retained temporarily in the accumulator register 5. Through the analytic platform 6, and the decoder platform 7, the video control signal, the decoded video signal of the subtitle image control signal W1, and the subtitle image signal W1 are retained temporarily in the accumulator register 5. Then the subtitle image control signal W2, and the subtitle image control signal W3 are continuingly decoded and retained temporarily in the accumulator register 5.

Figure 4A:
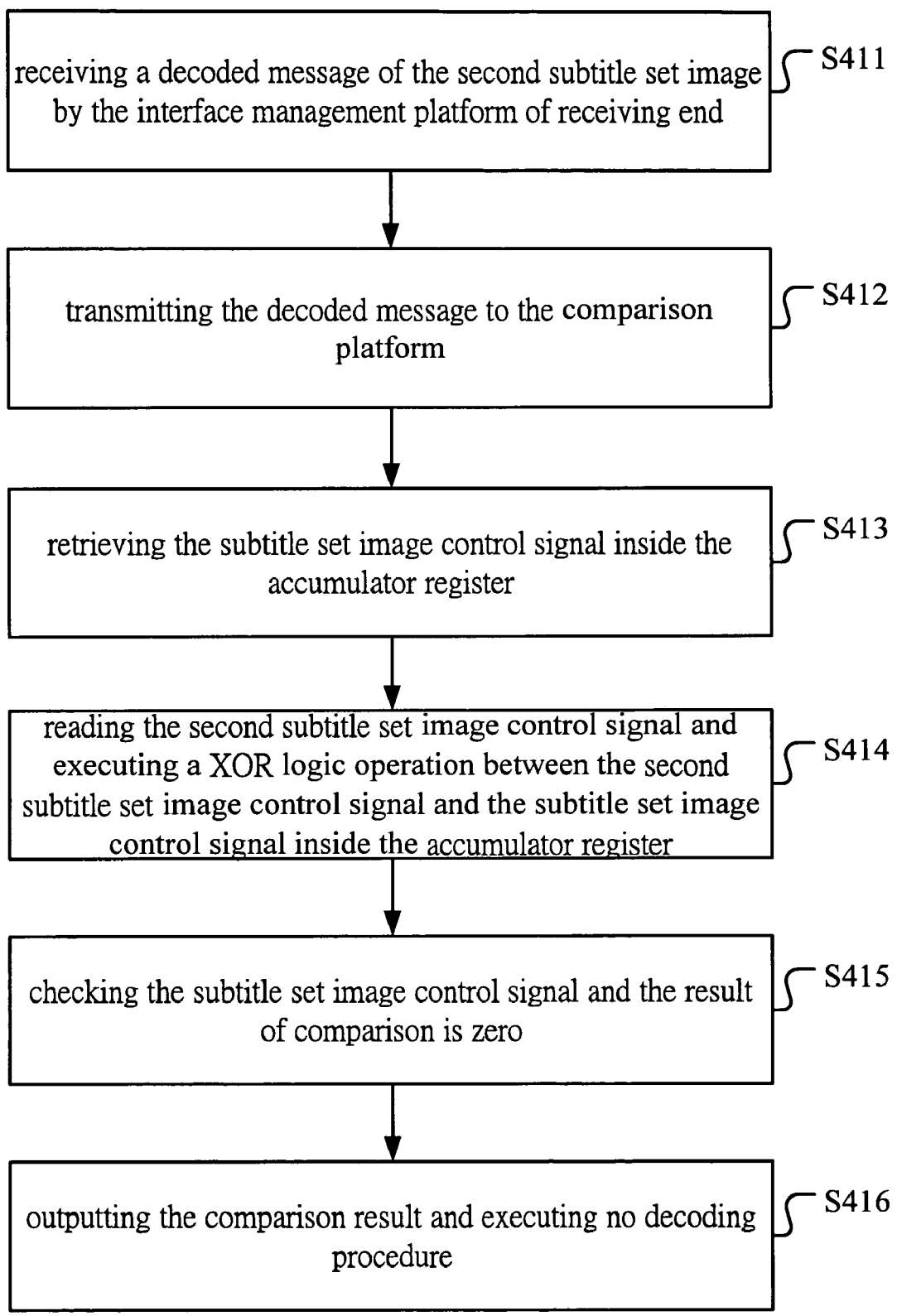
FIG. 4A is a flow chart of an embodiment with the same comparison result of the subtitle set image in accordance with the present invention.

When users in receiving end successively instruct decoding signals of subtitle set, the interface management platform of receiving end 3 also keeps instructing the comparison platform 4 to make a comparison with the subtitle set image data inside the accumulator register 5. Refer to FIG. 4A, a flow chart of an embodiment with the same comparison result of the subtitle set image in accordance with the present invention is disclosed. The flow chart includes following steps:

Step S411: receiving a decoded message of the second subtitle set image by the interface management platform of receiving end 3;

Step S412: transmitting the decoded message to the comparison platform 4;

Step S413: retrieving the subtitle set image control signal inside the accumulator register 5;

Step S414: reading the second subtitle set image control signal and executing a XOR logic operation between the second subtitle set image control signal and the subtitle set image control signal inside the accumulator register 5;

Step S415: checking the subtitle set image control signal and the result of comparison is zero;

Step S416: outputting the comparison result and executing no decoding procedure

Figure 4B:
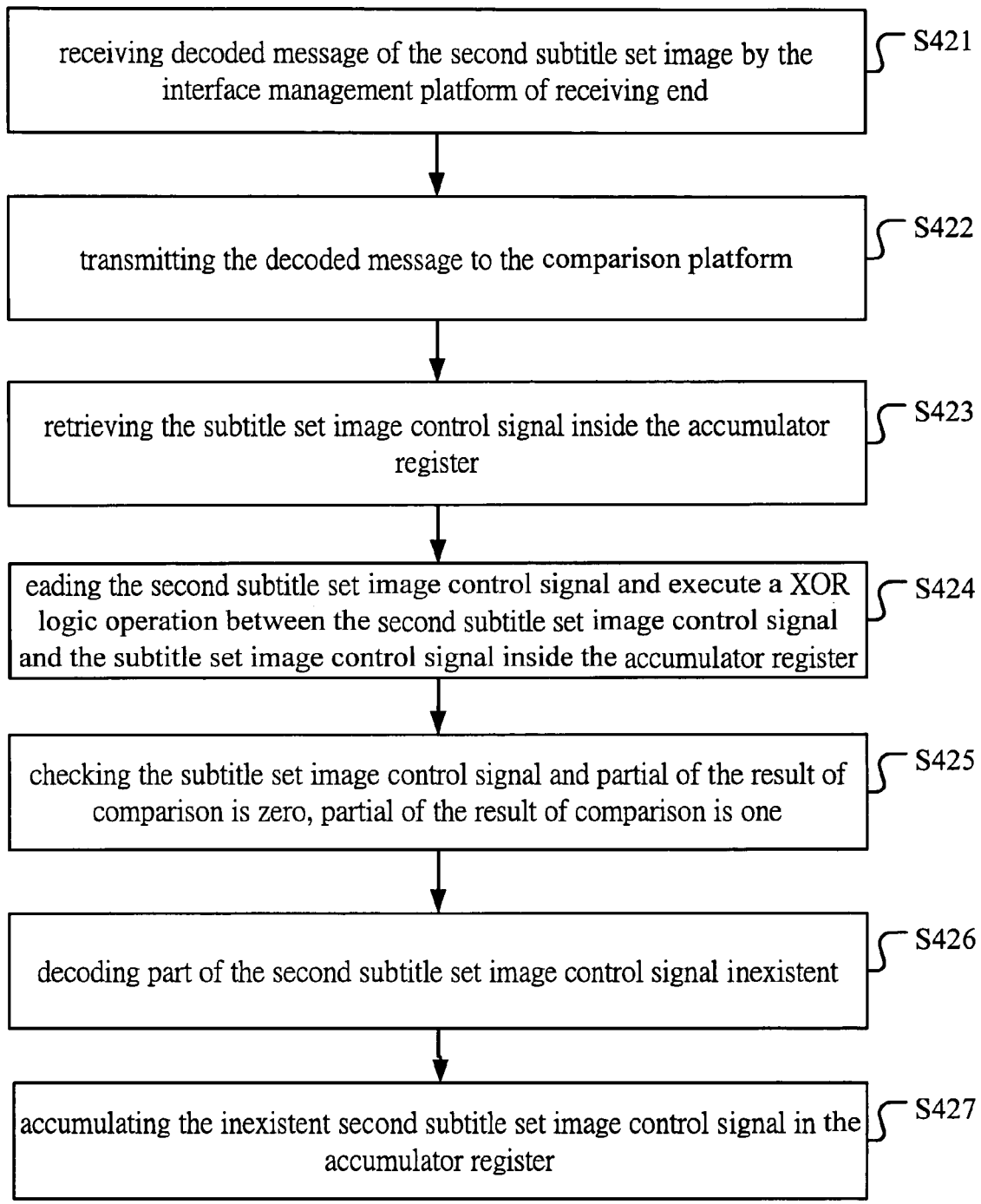
FIG. 4B is a flow chart of an embodiment with part of different comparison result of the subtitle set image in accordance with the present invention.

Refer to FIG. 4B, a flow chart of an embodiment with part of different comparison result of the subtitle set image in accordance with the present invention is disclosed. The flow chart includes following steps:

Step S421: receiving decoded message of the second subtitle set image by the interface management platform of receiving end 3;

Step S422: transmitting the decoded message to the comparison platform 4;

Step S423: retrieving the subtitle set image control signal inside the accumulator register 5;

Step S424: reading the second subtitle set image control signal and execute a XOR logic operation between the second subtitle set image control signal and the subtitle set image control signal inside the accumulator register 5;

Step S425: checking the subtitle set image control signal and partial of the result of comparison is zero, partial of the result of comparison is one;

Step S426: decoding part of the second subtitle set image control signal inexistent;

Step S427: accumulating the inexistent second subtitle set image control signal in the accumulator register 5.

Figure 4C:
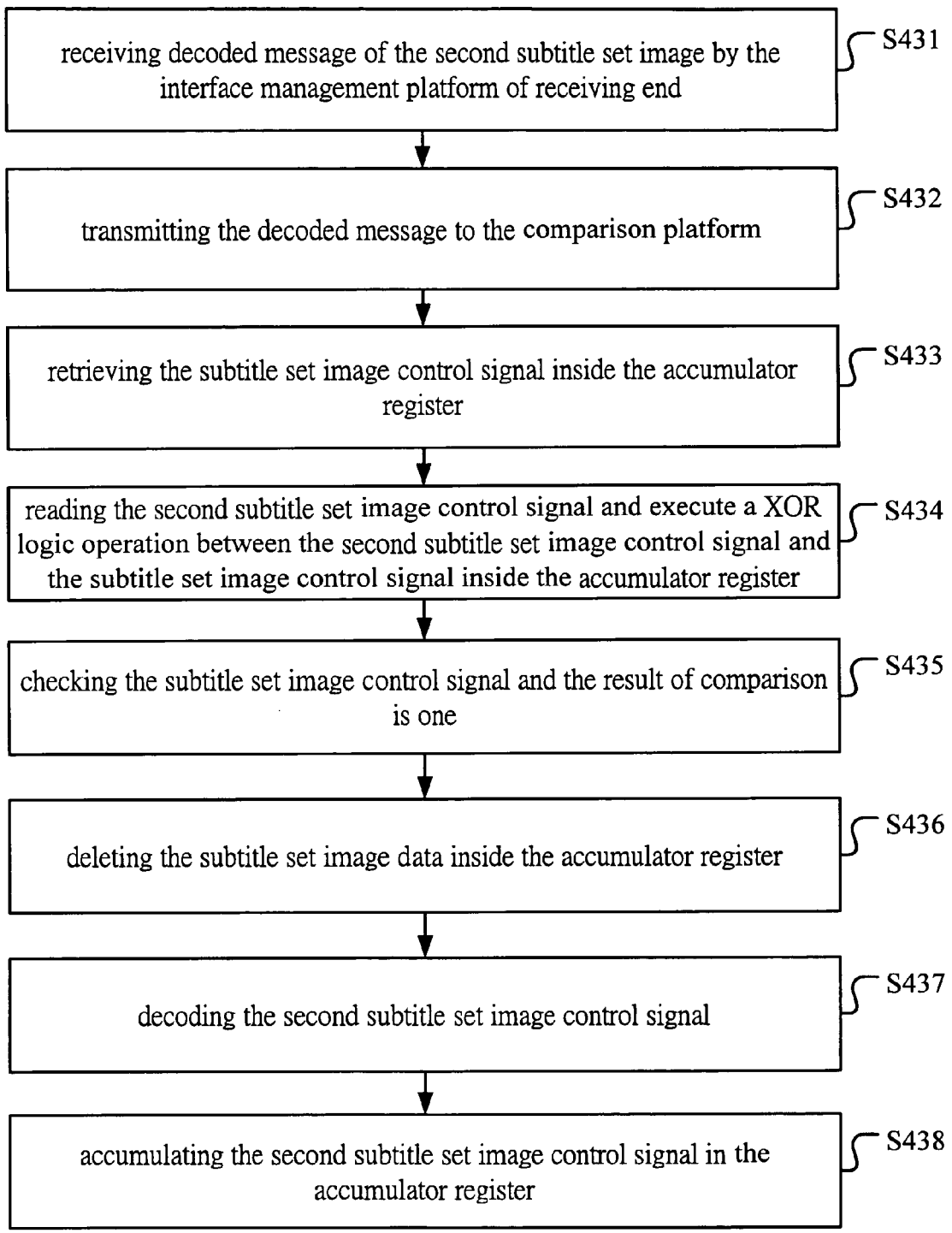
FIG. 4C is a flow chart of an embodiment with totally different comparison result of the subtitle set image in accordance with the present invention.

Refer to FIG. 4C, a flow chart of an embodiment with totally different comparison result of the subtitle set image in accordance with the present invention is disclosed. The flow chart includes following steps:

Step S431: receiving decoded message of the second subtitle set image by the interface management platform of receiving end 3;

Step S432: transmitting the decoded message to the comparison platform 4;

Step S433: retrieving the subtitle set image control signal inside the accumulator register 5;

Step S434: reading the second subtitle set image control signal and execute a XOR logic operation between the second subtitle set image control signal and the subtitle set image control signal inside the accumulator register 5;

Step S435: checking the subtitle set image control signal and the result of comparison is one;

Step S436: deleting the subtitle set image data inside the accumulator register 5;

Step S437: decoding the second subtitle set image control signal;

Step S438: accumulating the second subtitle set image control signal in the accumulator register 5

In order to explain more clearly, the following is a further explanation of the comparison result. Once the users in receiving end send a decoded message of a second subtitle set image to the interface management platform of receiving end 3. The second subtitle set image control signal is composed by a subtitle image control signal W2, a subtitle image control signal W3, a subtitle image control signal W6, and a subtitle image control signal W9. When the comparison platform 4 receives the decode message, it retrieves the existent subtitle set image control signal inside the accumulator register 5, such as the subtitle image control signal W1, the subtitle image control signal W2, and the subtitle image control signal W3 shown in FIG. 3. Then execute a XOR logic operation between the retrieving existent subtitle set image control signal inside the accumulator register 5 and the second subtitle set image control signal. Later, the subtitle image control signals W2 and W3 in the accumulator register 5 with the zero result of comparison are retained and the inexistent second subtitle set image control signal such as the subtitle image control signal W6, and the subtitle image control signal W9 are decoded as well as retained in the accumulator register 5 in sequence. Therefore, all the subtitle set images users need are available, and there is no need to repeatedly decode the subtitle W2 and W3 so as to avoid the waste of system resources as well as time consumption.

Figure 5:
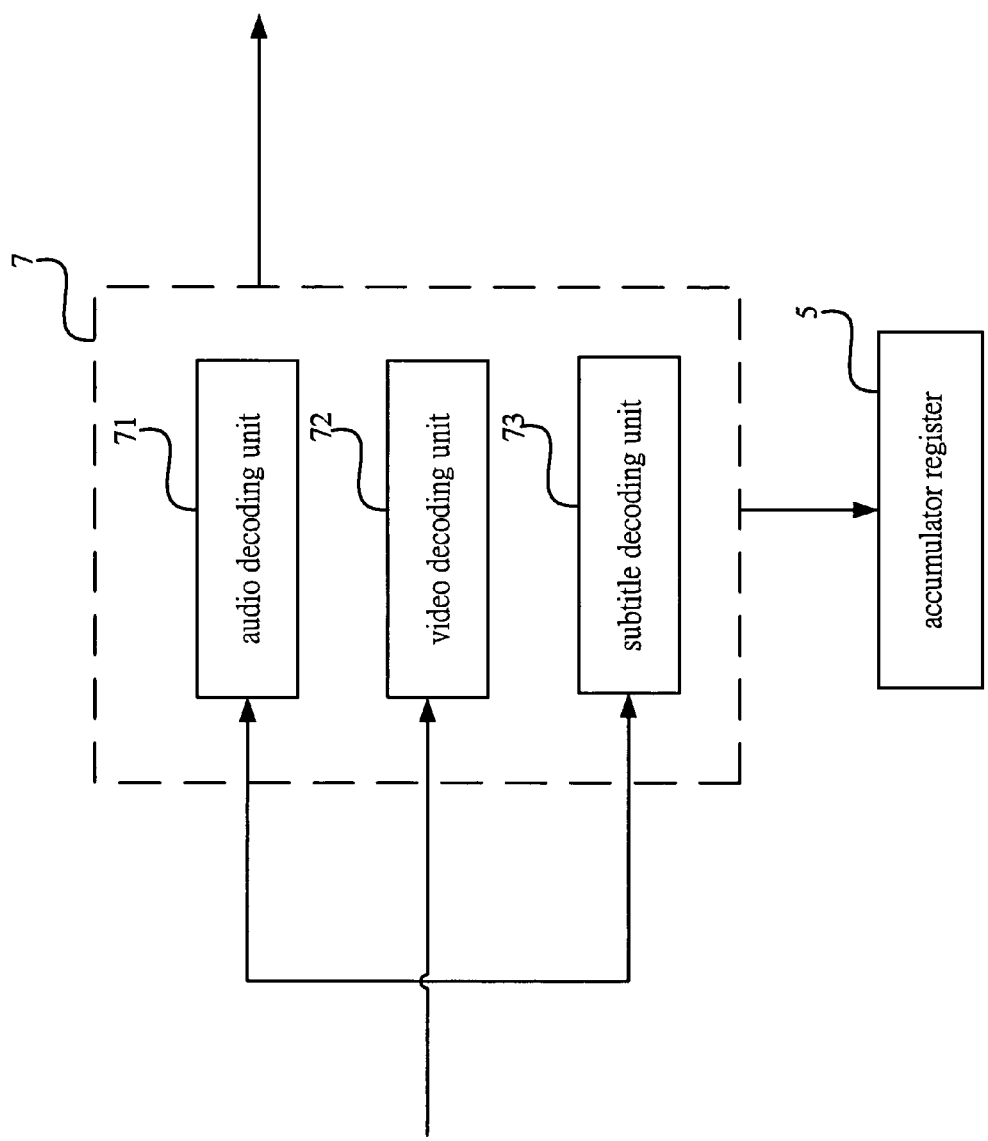
FIG. 5 is a schematic drawing of a decoder platform in accordance with the present invention.

Refer to FIG. 5, a schematic drawing of a decoder platform 7 is disclosed. The decoder platform 7 consists of an audio decoding unit 71 for decoding audio data flow into digital audio signals; a video decoding unit 72 for decoding video data flow into digital video signals and a subtitle decoding unit 73 for decoding the first subtitle set image data flow into a first subtitle set image signal. After being decoded, the video signal and the first subtitle set image signal are transmitted to the accumulator register 5.

Figure 6:
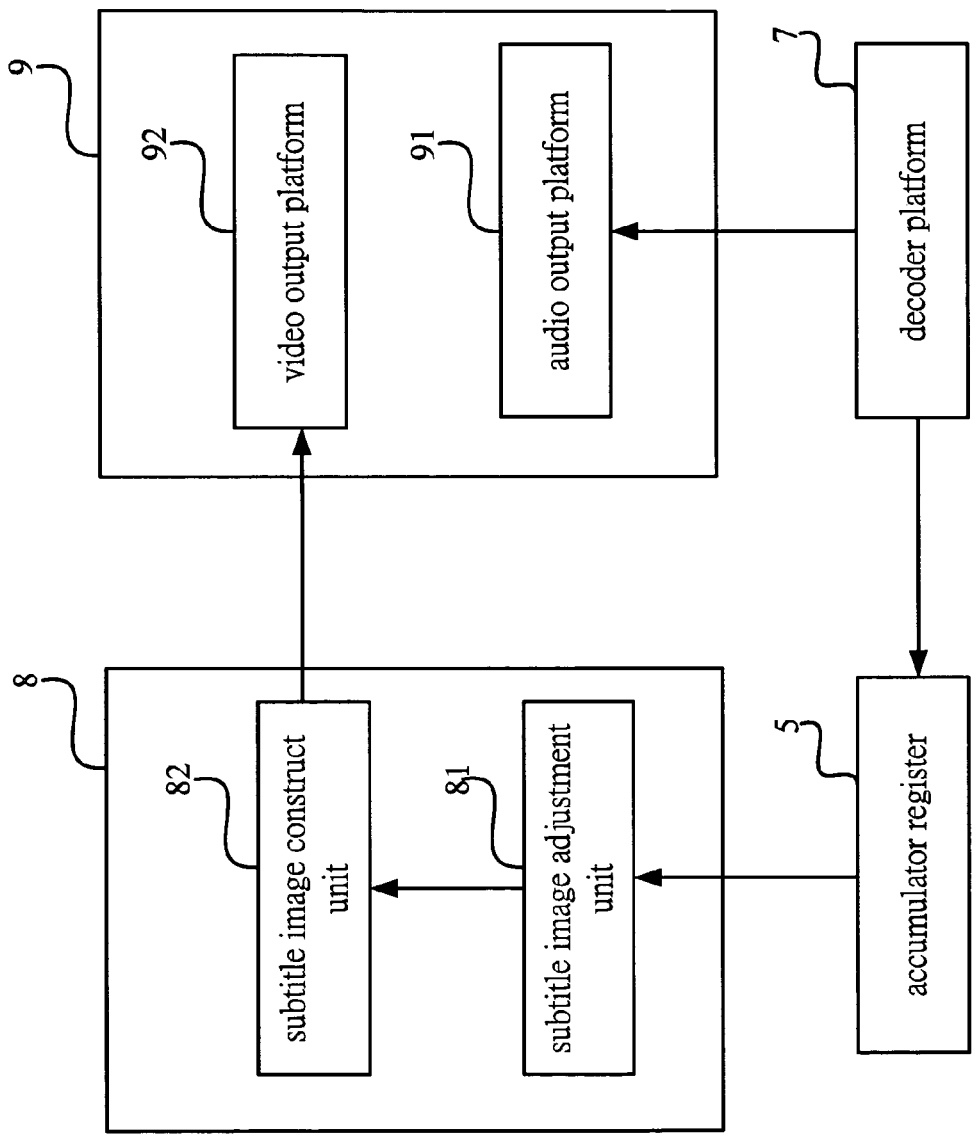
FIG. 6 is a schematic drawing of an image construct platform in accordance with the present invention.

Refer to FIG. 6, a schematic drawing of the image construct platform 8 and the output platform 9 is disclosed. The image construct platform 8 is composed by a subtitle image adjustment unit 81 for retrieving the video signal and the subtitle set image signal with multi-subtitles and adjusting the position of the subtitle set image signal on the subtitle image frame; and a subtitle image construct unit 82 for adjusting the displaying mode of the subtitle set image signal. After being adjusted, then subtitle set image signal together with the audio signals from the decoder platform 7 are transmitted to the output platform 9 and then output digital video signal and digital audio signal. The output platform 9 includes a video output platform 92 for outputting the digital video signal mixed with the subtitle set image signal with multi-subtitles and an audio output platform 91 for outputting the digital audio signal.

A System and method of DVD player for displaying multiple subtitles in accordance with the present invention includes a loading platform for reading digital data, an identifying code of data flow and a first subtitle set image control signal having a plurality of subtitle image control signals from a DVD storage media; an interface management platform of receiving end for receiving and transmitting a decoded message of a first subtitle set image; an accumulator register for temporarily retaining decoded video data and accumulating the decoded subtitle set image data that is composed by a subtitle set image control signal and a subtitle set image signal; a comparison platform for checking whether the first subtitle set image control signal exists in the accumulator register; If not, the first subtitle set image control signal is saved temporarily in the accumulator register and then is analyzed into a video data flow, an audio data flow and a first subtitle set image data flow according to the identifying code of data flow and the first subtitle set image control signal through an analytic platform; a decoder platform for decoding the video data flow, the audio data flow and the first subtitle set image data flow respectively to produce a digital video signal, a digital audio signal and a first subtitle set image signal and retain the digital video signal and the first subtitle set image signal temporarily inside the accumulator register; an image construct platform for mixing the digital video signal and the first subtitle set image signal inside the accumulator register and adjusting the positions of the video signal and the subtitle signal in images; and an output platform for outputting the digital video signal and the digital audio signal. While the interface management platform of receiving end continuingly transmits at least one decoded message of a second subtitle set image to the comparison platform. The comparison platform reads the second subtitle set image control signal provided by the loading platform and makes a comparison between the second subtitle set image control signal and the first subtitle set image control signal inside the accumulator register so that the decoder platform decodes the second subtitle set image control signal inexistent in the accumulator register. Thus the repeated decoding of images and subtitles, the waste of system resources and time are reduced. Not only waiting time of users in receiving end is shortened, but also the right for users to display multiple subtitles is assured.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A DVD player device for displaying multiple subtitles comprising:
    a loading platform for reading digital data, an identifying code of data flow and a first subtitle set image control signal having a plurality of subtitle image control signal from a DVD storage media;
    an interface management platform of receiving end for transmitting a decoded message of the first subtitle set image;
    an accumulator register for temporarily retaining decoded video data and accumulating decoded subtitle set image signal and the corresponding subtitle set image control signal;
    a comparison platform for receiving the decoded message of the first subtitle set image, checking whether the first subtitle set image control signal exists in the accumulator register and retaining temporarily a first subtitle image control signal inexistent in the accumulator register;
    an analytic platform for analyzing the digital data into a video data flow, an audio data flow and a first subtitle set image data flow according to the identifying code of data flow and the first subtitle set image control signal;
    a decoder platform for decoding the video data flow, the audio data flow and the first subtitle set image data flow respectively to produce a digital video signal, a digital audio signal and a first subtitle set image signal and retain the digital video signal and the first subtitle set image signal temporarily inside the accumulator register;
    an image construct platform for mixing the digital video signal and the first subtitle set image signal inside the accumulator register into a mixed digital video signal; and
    an output platform for outputting the mixed digital video signal and the digital audio signal;
    wherein the interface management platform of receiving end continuingly transmits at least one decoded message of a second subtitle set image to the comparison platform that reads the second subtitle set image control signal provided by the loading platform and make a comparison between the second subtitle set image control signal and the first subtitle set image control signal inside the accumulator register so that the analytic platform and the decoder platform decode the subtitle set image control signal inexistent in the accumulator register.

2. The device according to claim 1, wherein making a comparison is a XOR logic operation for checking whether the second subtitle set image control signal exists in the accumulator register.

3. The device according to claim 1, wherein making a comparison is an operation method for checking whether the subtitle set image control signal is repeated.

4. The device according to claim 1, wherein the decoder platform having
    a video decoding unit for decoding the video data flow;
    a subtitle decoding unit for decoding the first subtitle set image data flow; and
    an audio decoding unit for decoding the audio data flow.

5. The device according to claim 1, wherein the image construct platform having
    a subtitle image adjustment unit for adjusting positions of the first subtitle set image signal and a second subtitle set image signal on a subtitle image frame; and
    a subtitle image construct unit for adjusting displaying mode of the first subtitle set image signal and the second subtitle set image signal.

6. The device according to claim 1, wherein the output platform having
    an audio output platform for outputting the digital audio signal; and
    a video output platform for outputting the mixed digital video signal.

7. A method of a DVD player device for displaying multiple subtitles comprising:
    reading digital data, an identifying code of data flow and a first subtitle set image control signal having a plurality of subtitle image control signal from a DVD storage media by a loading platform;
    transmitting a decoded message of the first subtitle set image by an interface management platform of receiving end into a comparison platform; reading the first subtitle set image control signal and comparing the first subtitle set image control signal with subtitle set image control signal in an accumulator register by the comparison platform;
    analyzing the digital data into a video data flow, an audio data flow and a first subtitle set image data flow according to the identifying code of data flow and the first subtitle set image control signal;
    decoding the video data flow, the audio data flow and the first subtitle set image data flow respectively in a decoder platform to produce a digital video signal, a digital audio signal and a first subtitle set image signal;

retaining temporarily the digital video signal, the first subtitle set image signal and the first subtitle set image control signal inside the accumulator register;

wherein the interface management platform of receiving end continuingly transmits at least one decoded message of the second subtitle set image to the comparison platform that makes a comparison for checking whether a second subtitle set image control signal exists in the accumulator register so as to avoid repeatedly decoding; wherein conditions of making a comparison are:

after checking, the second subtitle set image control signal is the same with the first subtitle set image control signal in the accumulator register, there is no decoding procedure;

after checking, part of the second subtitle set image control signal is in the accumulator register, decoding part of the second subtitle set image control signal inexistent in the accumulator register; and after checking, the second subtitle set image control signal is inexistent in the accumulator register, decoding the second subtitle set image control signal;

mixing the digital video signal and the subtitle set image signal inside the accumulator register by an image construct platform for adjusting positions of the digital video signal and the subtitle set image signal to produce a mixed digital video signal; and outputting the mixed digital video signal and the digital audio signal.

8. The method according to claim 7, wherein making a comparison is a XOR logic operation for checking whether the second subtitle set image control signal exists in the accumulator register.

9. The method according to claim 7, wherein making a comparison is an operation method for checking whether the subtitle set image control signal is repeated.

10. The method according to claim 7, wherein the decoder platform decoding various data flow by a video decoding unit, a subtitle decoding unit, or an audio decoding unit thereof respectively.

11. The method according to claim 7, wherein adjusting positions of the subtitle set image signal is to adjust displaying positions of a first subtitle image signal and a second subtitle image signal on a subtitle image frame and adjust displaying modes of the first subtitle image signal and the second subtitle image signal.

* * * * *